Figure 1:
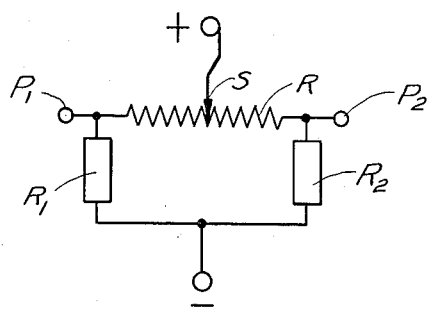

June 29, 1937.   H. WARNCKE   2,085,205
METHOD AND MEANS TO SCAN SOUND FILMS WITH A PLURALITY OF SCANNERS
Filed March 26, 1935

INVENTOR
HANS WARNCKE
BY
ATTORNEY

Patented June 29, 1937

2,085,205

UNITED STATES PATENT OFFICE 2,085,205

METHOD AND MEANS TO SCAN SOUND FILMS WITH A PLURALITY OF SCANNERS

Hans Warncke, Berlin-Suedende, Germany, assignor to Klangfilm G. M. B. H., Berlin, Germany, a corporation of Germany Application March 26, 1935, Serial No. 13,065
In Germany March 7, 1934

3 Claims. (Cl. 179—100.3)

The invention is concerned with a method and with means adapted to scan sound films in which two or more sound scanners comprising photoelectric cells are preferably sequentially brought to act.

For the uninterrupted reproduction of a motion picture program, it has heretofore been general practice to use two projector machines, and each one of these was equipped with its own sound scanner or pick-up apparatus. On changing from one machine to the other, the sound scanner of one projector is disconnected and then that of the other machine is re-connected with the amplifiers and loudspeaker apparatus.

Now, it has been found that especially after prolonged working periods, when changing over the said acoustic equipment, differences in the sound volume become occasionally noticeable, and these are likely to inconvenience sound reproduction to an appreciable degree. The underlying reason is that the sound pick-up means differ from each other, e. g., because of discrepancies in the sensitivity of the cells, or because of dissimilarities in the optical properties of other parts of the equipment. Such discrepancies may manifest themselves often only after a comparatively long time of operation in that, for example, one photoelectric cell or acoustic scanner lamp is exhausted before this happens with the other. But the result of this condition is that the level of the acoustic frequency voltage obtained from the cells will be higher in the case of one of the outfits than in the others, most particularly when the said parts must be replaced by new ones.

In order to obviate these drawbacks the suggestion is made according to this invention to neutralize and compensate electrical or optical dissimilarities in the acoustic scanner apparatus by that the positive or anode potential of the photoelectric cells used in the apparatus, or the light caused to impinge upon the cells, are regulated. The volume regulation of the light in such a scheme is insured independently of the variable light.

Under practical working conditions, this idea may be utilized preferably in such a way that the positive potential is re-adjusted whenever, for instance, a new photoelectric cell or a new scanner lamp is fitted into the equipment, or whenever for other reasons such as for optical reasons, the level of the sound volume of one outfit happens to have changed in relation to that of the other. The regulation of the anode or positive voltage in this scheme is effected most advantageously by way of resistances, preferably in a voltage divider arrangement. The dosing of the light allowed to fall upon the cells may be effected by regulation of the acoustic lamp voltage or by the interposition in the path of the scanning rays of grey cones or diaphragms, say, directly in front of the film.

The object of the invention is to provide a new and useful method of and apparatus for changing-over from one sound picture projector to another without the introduction of extraneous sounds and with no change in audible volume.

The invention and its basic ideas shall be explained in more detail by reference to the drawing Figs. 1, 2, and 3. Referring to Fig. 1, the anode or positive potential for the photo-electric cell of one acoustic outfit is taken off at the point marked P1, while that of the second photo cell at the point marked P2. Connected across these two points is the resistance R of the voltage divider comprising the contact slide S which is united with the positive pole of the battery. The fixed resistances R1 and R2 of the voltage divider are connected at one end with the joint negative lead. In the central position of the switch S, in the presence of otherwise equal electrical conditions, the same anode voltage will be tapped at the points P1 and P2 which is governed by the ratio of the resistances of the voltage divider. On shifting the slide S in the direction of P1, the positive or anode potential at point P1 is increased, while that prevailing at point P2 will be diminished a corresponding or like amount. As a result, however, the sensitiveness of the two photoelectric cells will be varied, and this is associated also with a variation of the sound volume level; in fact, in the sense of the present invention the said change is to be accomplished in such a way that in the two outfits the identical level is to prevail.

Figure 2:
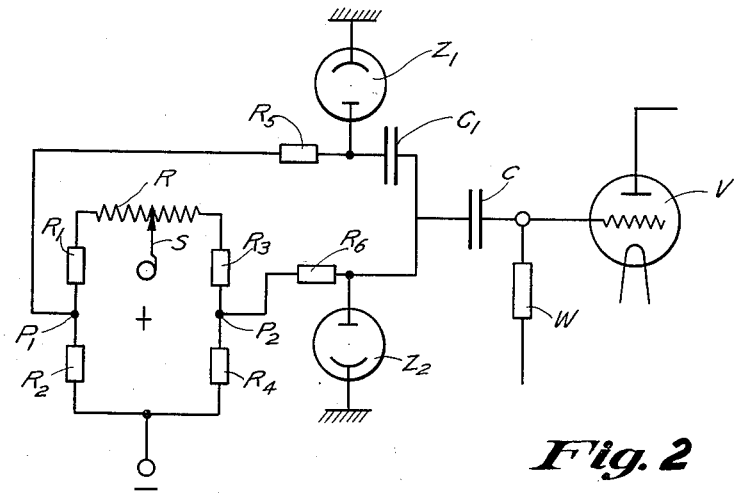

Fig. 2 shows another embodiment of the invention: The positive potential for the photocells Z1 and Z2 is tapped at points P1 and P2. In accordance with this invention, the same is regulated by way of the variable resistance R and the resistances R1 to R4, and then applied as well known in the art by way of resistances R5 and R6 to the cells. What thus results for the photoelectric cell Z1 is a potential which is governed by the relation of R1 plus the corresponding value of the variable resistance R to R2. By shifting the slide S, the resistance R is altered and thus also the positive potential applied to the cells. Connection of the cells is insured as known in the art by way of the condenser C and resistance W with the first or input amplifier stage V. To prevent the positive or anode potential from becoming equalized a condenser C1 is provided. It has been found that the insertion of the condenser substantially simplifies the connection of the cells with the input amplifier. In the presence of a voltage divider circuit scheme as shown, it would otherwise be necessary either to provide an input amplifier for each photoelectric cell or else to disconnect or connect the photocells by means of distinct switches at the instant of changing over to the amplifier.

Figure 3:
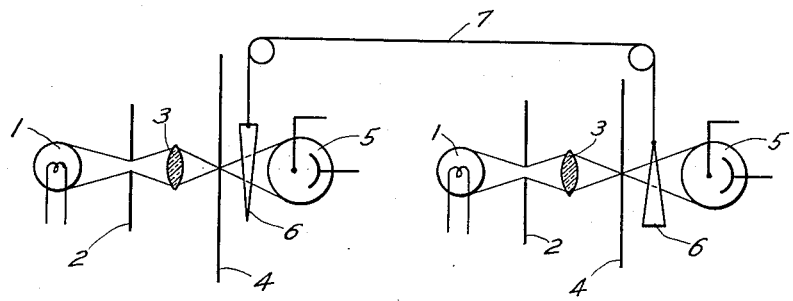

Two reproducer outfits are schematically illustrated in Fig. 3. The scanning lamps 1 illuminate a slit which by the aid of the optical means 3 is projected or imaged upon the films 4 in a way well known in the art. Such light as is allowed to be transmitted across the films falls upon the photocells 5. Between the photocells and the films grey cones 6 are interposed according to the invention, the position of which in the path of the rays may be regulated by way of the connection by raising and lowering so that the flux of light striking the cell will be either increased or decreased. To carry the idea underlying the invention into practice, the use of merely one such filter or grey cone will be sufficient provided in one of the two outfits. With a view to volume regulation of the light, the voltage of the acoustic or scanner lamp could be regulated also by the aid of resistances with the consequence that the brightness of the scanner lamps is caused to increase or decrease.

I claim:

1. Apparatus of the class described comprising a plurality of light sensitive devices, a source of potential for said devices, means for simultaneously and oppositely varying the potential applied to said devices, resistors in the circuit between said means and said devices, means adapted to be actuated by said devices, and condenser means coupling said devices to said last means.

2. Apparatus of the class described comprising two light-sensitive devices, a source of potential for said devices, means for simultaneously and oppositely varying the potential applied to said devices, resistors in the circuit between said means and said devices, an amplifier adapted to be actuated by said devices, and condenser means coupling said devices to said amplifier.

3. Apparatus of the class described comprising a plurality of light sensitive devices, a source of potential for said devices, means for simultaneously and oppositely varying the potential applied to said devices, resistors in the circuit between said means and said devices, means adapted to be actuated by said devices, a condenser coupling said devices to said last means, and a condenser interposed between the output electrodes of said devices.

HANS WARNCKE.